Jan. 23, 1934.  W. C. DOWNING, JR  1,944,656
METER
Filed Aug. 18, 1930
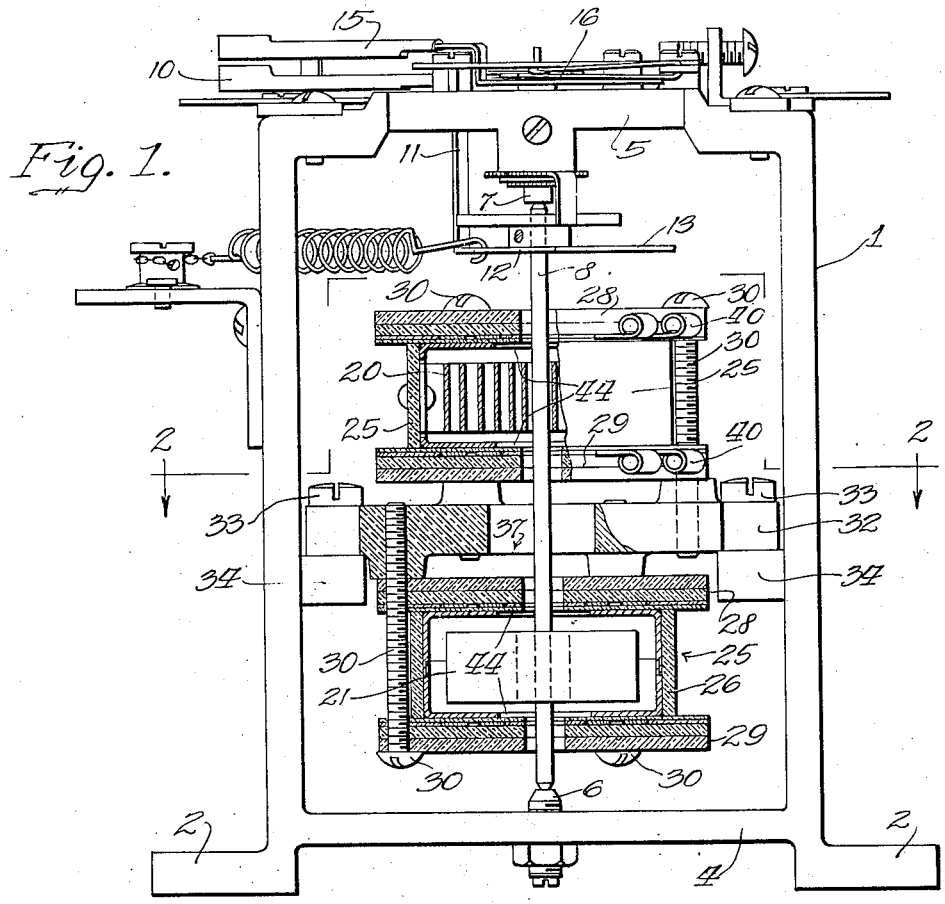
Fig. 1.
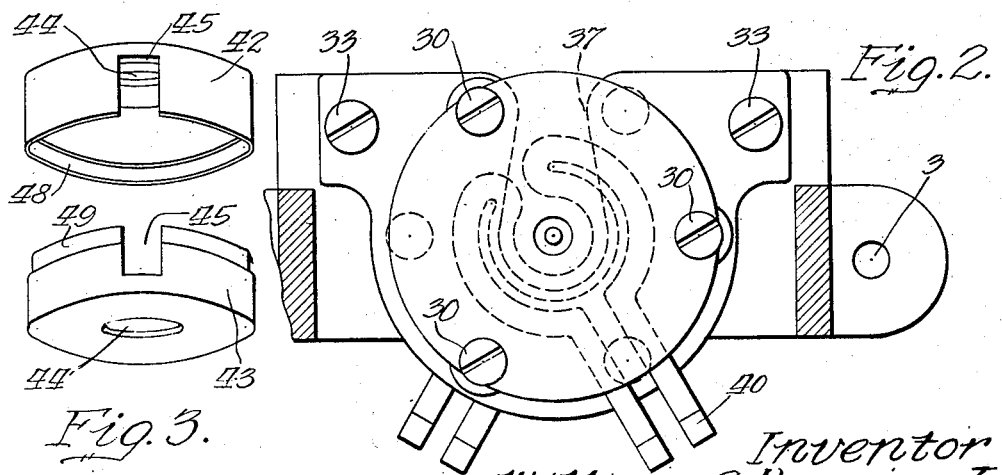
Fig. 2.
Fig. 3.
Inventor
William C. Downing Jr.
By Brown, Jackson, Boettcher & Dienner
Attys.

Patented Jan. 23, 1934

1,944,656

UNITED STATES PATENT OFFICE 1,944,656

METER

William C. Downing, Jr., Springfield, Ill., assignor to Lincoln Meter Company, Inc., Springfield, Ill., a corporation of Illinois Application August 18, 1930. Serial No. 475,888

3 Claims. (Cl. 171—271)

The present invention relates to meters, and more particularly to electrical measuring instruments, commonly known as thermal meters, examples of which are thermal demand ammeters and watt meters. This type of measuring instrument is well known in the art and for a more complete understanding of this type of instrument reference may be had to the Patent No. 1,300,283, to P. M. Lincoln and B. H. Smith, issued April 15, 1919.

Briefly, measuring instruments of this type depend upon heat and heat storage and are based on the fundamental principle that if heat is applied to any mass of matter at a given rate the temperature of that matter will begin to rise and will continue to rise until the rate at which heat escapes is just equal to the rate at which it is applied, that is, until a state of equilibrium is established. This principle is made use of in the meter of the above identified patent in the following manner. A thermal responsive member in the form of a bimetallic coil is subjected to the application of heat emanating from one or more heating coils inserted in the circuit to be measured. The thermal responsive member is encased within a cylindrical metallic casing so arranged that the heat dissipated and radiated from the heating coils is directed into thermal contact with the thermal responsive member. This latter member is connected with a shaft to which a pointer is attached, and as more heat is applied to the thermal responsive member the shaft and indicating hand are turned to an angle in accordance with the rise of the temperature of the thermal responsive member.

While meters constructed as indicated above have been generally satisfactory it has been observed that occasionally large discrepancies appear between the theoretical and actual results attained. Investigations revealed that these discrepancies could be altered through a change in in the relative location of the thermal responsive member and the walls of the casing, and that greatly improved results occurred when some means were provided for distributing the thermal energy uniformly through the interior of the casing.

The principal object of the present invention is to provide a construction wherein such inaccuracies and discrepancies would be obviated. More particularly, the present invention is concerned with means for uniformly distributing the heat about the thermal responsive member and to minimize possible temperature differences between different points inside the housing enclosing the thermal responsive member and the heating coils.

Other objects and advantages of the present invention will be apparent to those skilled in the art after a consideration of the following detailed description of the preferred embodiment of the present invention, taken in conjunction with the accompanying drawing, in which:

Figure 1 is a vertical section, partly in elevation, showing the present invention as embodied in an electrical measuring instrument;

Figure 2 is a view taken along the line 2—2 of Figure 1 and looking in the direction of the arrows; and Figure 3 is a perspective view, on a reduced scale, showing the heat distributing shells.

Referring now to the drawing, the reference numeral 1 indicates the frame of the instrument, the frame being preferably provided with attaching feet or lugs 2 having apertures 3 therein. The frame 1 also comprises transverse connecting portions 4 and 5 which are, respectively, provided with pivot bearings 6 and 7 receiving the pointed ends of the spindle 8. An indicating hand 10 is connected, by means of offset portions 11 and 12, to the spindle 8. The offset portion 12, if desired, may have a counterbalance 13 to compensate for the weight of the pointer 10. The instrument shown in Figure 1 is also provided with a maximum indicating pointer 15 and means, indicated in its entirety by the reference numeral 16, for frictionally retaining this maximum indicating pointer or hand 15 in any position to which it is moved by the pointer or hand 10. Since this particular structure forms the subject matter of a copending application, Serial No. 473,352, filed August 6, 1932 by Lewis Dana Johnson, now Patent No. 1,807,215, issued May 26, 1931, further description of this structure is deemed unnecessary here.

Secured to the spindle 8 is a pair of thermal responsive elements in the form of two bimetallic coils 20 and 21, these coils being preferably wound in opposite directions so that changes in atmospheric temperature will not affect the meter. In Figure 1 the upper bimetallic coil 20 is shown partly in section while the lower coil or thermal responsive member is shown in elevation.

Surrounding each of the thermal responsive elements 20 and 21 is a housing or casing 25, and since these housings or casings are identical a detailed description of one will suffice. Each casing includes a ring member 26 of cylindrical formation securely clamped between two heads 28 and 29. Each head includes a plurality of plates or discs securely cemented or otherwise fastened together and which are provided with properly aligned apertures for the retention of mounting bolts 30. Preferably, the cylindrical member 26 and the plates forming the head members 28 and 29 are formed of heat insulating material, such as any of the commercial forms of phenol condensation products and other materials of a similar nature. The mounting screws or bolts 30 for each of the casings 25 are constructed and arranged to be threaded into a transverse supporting member 32 secured by means of screws 33 to mounting lugs 34 formed on or rigidly secured to the sides of the frame 1, as best shown in Figure 1. The transverse supporting member 32, which is also preferably formed of a material the same as or similar to that forming the plates and the cylindrical member 25, is provided with a curved notch 37 to accommodate the spindle or shaft 8, the plates of the head members 28 and 29 being apertured for the purpose of permitting the spindle 8 to pass therethrough.

Heating elements or coils 40 are provided for heating the thermal responsive member 20, and preferably a coil 40 is interposed between two adjacent plates on each of the head members 28 and 29. These coils 40 are formed as indicated in Figure 2 and have terminals affording convenient means for connection in an electrical circuit. As best shown in Figure 1, each of the thermal responsive elements is subjected to the heat from two of these heating coils. These coils may be connected in various ways in the electrical circuits, as more clearly indicated in the above identified patent. Since this forms no part of the present invention a description of the connections is deemed unnecessary.

For the purpose of distributing the heat emanating from the heating coils 40 uniformly within the housings 25 each of the latter is provided with heat distributing means in the nature of metallic shells 42 and 43, shown in disassembled relation in Figure 3. Preferably, these shells are formed of thermal conductive material having high thermal conductivity, such as copper, and are constructed and arranged to completely surround the bimetallic thermal responsive member 20, the only interruption of the continuity of such heat distributing surface being the apertures 44 necessary for the reception of the spindle 8, and the slots 45 to accommodate the end of the thermal responsive member which is secured, as by a rivet, to the cylindrical portion of the housing 25.

Preferably, the heat distributing shells 42 and 43 are formed to be tightly encased by the housing 25. The two sections 42 and 43 making up one complete heat distributing shell are frictionally secured together by contacting flanges 48 and 49, the former receiving the latter as best shown in Figure 3.

It is to be understood that the heater elements 40 are insulated electrically from the heat distributing shells just described.

The operation of the present device is believed to be obvious from the above description. The coils 40 being connected in the electric circuit in any manner desired, the heat radiating therefrom will be distributed and conducted by the metallic shells, the material thereof, being preferably copper, having a very high thermal conductivity resulting in a rapid flow of heat from points of high temperature to points of low temperature, thereby soon equalizing the temperature in the interior of housing 25 and metallic shell to a degree which may be considered as constant for all practical purposes. This condition is desirable so that the average temperature of the thermal responsive member due to heat from either or both of the heater elements 40 will be substantially independent of the position of the thermal responsive member in the housing 25. This feature of the present invention is of particular value in the balancing of circuits in three wire single phase or in polyphase demand meters.

The uniform distribution of heat within the housings 25 is further accentuated by the heat insulating feature of the material of which the housings are constructed.

While I have shown and described the preferred construction in which the present invention is embodied it is to be understood that my invention is not to be limited to the specific structure shown and described, but that, in fact, widely different means may be employed in the practice of the broader aspects of my invention.

What I claim, therefore, and desire to secure by Letters Patent is:

1. A device of the class described, comprising a thermo-responsive element, a casing for said element, heating means in said casing, and means comprising a thin metallic shell formed of heat conducting material and arranged to entirely enclose the interior of said casing for distributing the heat within the casing, said casing being formed of heat insulating material and surrounding said shell.

2. A device of the class described, comprising a thermo-responsive element, an insulating casing for said element, heating means in said casing, and means comprising a thin metallic shell of uniform thickness enclosed within the casing surrounding said thermo-responsive element and interposed between said heating means and the thermo-responsive element for distributing uniformly to said element the thermal energy emanating from the heating means.

3. In a thermal meter, a thermo-responsive element, heater elements therefor, a substantially cylindrical member receiving the thermo-responsive element, mounting means for the heater elements disposed over the ends of the cylindrical member, means fixing one end of the thermo-responsive element to said cylindrical member, a metallic lining disposed within the cylindrical member and the heater mounting means, said metallic lining being of uniform thickness and comprising a pair of metallic shells, each including a cylindrical portion and an end portion, the cylindrical portions including a flanged and shouldered construction wherein the two shells may be assembled and frictionally held together, a slot formed in each of the shells and adapted when the latter are assembled to receive the fixed end of the thermo-responsive element, said shells being secured within said cylindrical member, and means for clamping the heater mounting means against the ends of said cylindrical member.

WILLIAM C. DOWNING, Jr.